Jan. 27, 1948.    G. V. WOODLING    2,434,975
TUBE COUPLING SLEEVE
Filed July 10, 1945

INVENTOR.
BY George V. Woodling

Patented Jan. 27, 1948

2,434,975

UNITED STATES PATENT OFFICE 2,434,975

TUBE COUPLING SLEEVE

George V. Woodling, Cleveland, Ohio

Application July 10, 1945, Serial No. 604,268

1 Claim. (Cl. 285—86)

My invention relates in general to connecting devices and more particularly to connecting devices for tube fittings.

An object of my invention is the provision of a clamping sleeve for engaging the tube at a point or place remote from the flared end of the tube which is pressed against the abutting end of the coupling element, whereby vibrations or shocks subjected to the tube are not carried over to the flared end of the tube.

Another object of my invention is the provision of a clamping sleeve which not only supports or engages the tube for dampening vibration but which also functions as an element for pressing the flared end of the tube against the abutting end surface of the coupling element.

Another object of my invention is the provision of a clamping sleeve which is harder than the tube, the coupling element, or the sleeve nut which presses the clamping sleeve against the flared end of the tube.

Another object of my invention is the provision of a clamping sleeve which has a greater tensile strength than the tensile strength of the tube, the coupling element or the sleeve nut.

Another object of my invention is the provision of a clamping sleeve which presses against the flared end of the tube and which will not "swell" or swage outwardly as it is pressed against the taper of the flared end of the tube.

Another object of my invention is the provision of a clamping sleeve which will not take a permanent set when contracted by the sleeve nut.

Another object of my invention is the provision of obviating the use of a slow taper between the clamping sleeve and the sleeve nut for the purpose of applying external pressure to the tube at a point remote from the flared end of the tube.

Another object of my invention is the provision of a clamped sleeve made of metallurgically hardened metal, whereby rearwardly extending fingers about the tube have sufficient strength to apply pressure to the tube for supporting same against vibration without the fingers being externally supported by the sleeve nut.

Another object of my invention is the provision of a metallurgically hardened clamping sleeve.

Another object of my invention is the provision of improving the fluid sealing engagement between the flared end of the tube and the abutting end of the coupling element against which the tube is pressed by the clamping sleeve.

Other objects and a fuller understanding of my invention may be had by referring to the following description and claim taken in conjunction with the accompanying drawings, in which:

Figure 1:
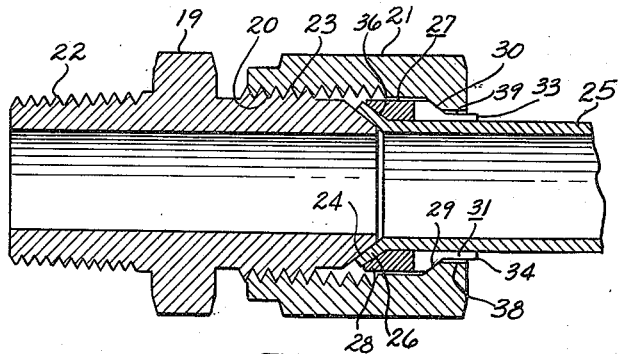
Figure 1 is a longitudinal cross-sectional view of a tube fitting and clamping sleeve embodying the features of my invention.
Figures 2, 3:
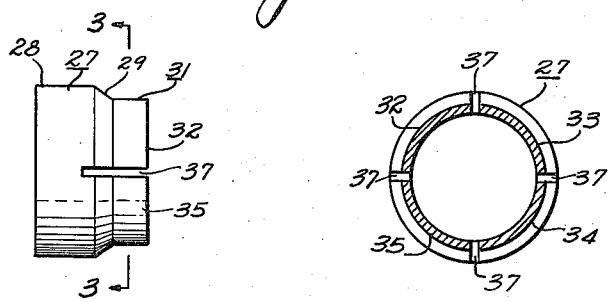
Figure 2 is a side view of the clamping sleeve.
Figure 3 is a cross-sectional view taken along the line 3—3 of Figure 2.

With reference to Figure 1 of the drawing, my invention is shown as being applied to a tube fitting or coupling device comprising a coupling element 19, a tube 25 adapted to be connected thereto, a clamping sleeve 27 surrounding the tube 25, and a sleeve nut 21 which is adapted to press the clamping sleeve 27 against the flared end 26 of the tube. The left-hand end of the coupling or fitting element 19 is provided with threads 22 which are usually in the form of pipe threads for engaging a cylinder or other fluid connecting devices. The right-hand end of the coupling element 19 is provided with male threads 20 to which is threadably attached the compression nut 21 having female threads 23 which threadably engage the male threads 20. The right-hand end of the coupling element 19 is provided with a beveled abutment end 24 against which the flared end 26 of the tube is tightly fastened by means of the clamping sleeve 27. The left-hand end of the clamping sleeve comprises an annular end portion 28 having an internal conical surface 36 which abuts against the flare 26 of the tube. Extending rearwardly of the annular end portion 28 of the clamping sleeve is a tapered intermediate portion 29, and a tail end portion 31. The tapered intermediate portion 29 and the tail end portion 31 are slotted at 37 which forms rearwardly extending clamping fingers 32, 33, 34, and 35, which are adapted to clamp the tube 25 at a point remote from the flared end of the tube for supporting the tube against vibration and fluid shock. The sleeve nut 21 is provided with an internal tapered or clamping shoulder 30 which presses against the tapered intermediate portion 29 of the clamping sleeve as the sleeve nut 21 is turned onto the coupling element 19. The angle of the tapered intermediate portion 29 and the internal clamping shoulder may be substantially of the same value as the angle of the taper of the flared end of the tube which abuts against the abutment end 24 of the coupling element 19.

As the sleeve nut 21 is turned onto the coupling element 19, the internal clamping shoulder 30 contracts the tapered intermediate portion 29 and thereby causes the clamping fingers 32, 33, 34, and 35, to be tightly clamped about the tube 25 to produce a good strong frictional grip. The intermediate tapered portion 29 constitutes the sole support for the clamping fingers 32, 33, 34, and 35, and in their clamped position a clearance 39 exists between the outer surface of the clamping fingers and the internal surface 38 of the sleeve nut. The clearance shows that the clamping fingers are radially spaced from and unsupported by the internal surface 38 of the sleeve nut 21.

In the prior art, clamping sleeves of the compression type are subject to defects. One of such defects is that as the internal conical surface of the sleeve engages the flare, the sleeve is disposed to "swell" or swage outwardly with the result that the clamping sleeve "rides-up" the flare of the tube. This radial swaging may extend to the point of the clamping sleeve engaging the internal surface of a sleeve nut. The swelling or "riding-up" of the clamping sleeve upon the flared end of the tube tends to damage or tear the flare of the tube with the result that a point of weakness exists in the connection. Another objection to the clamping sleeves in the prior art is that the clamping fingers are disposed to take a set when once clamped inwardly. In other words, the tapered intermediate portion may be crushed by the internal clamping shoulder on the sleeve nut whereby the clamping fingers do not return or spring back to their original position. Also in the prior art, the clamping fingers were weak and lacked sufficient strength for strongly gripping the tube at a point remote from the flare in order to absorb shock and vibration. Because of this lack of strength in the fingers, it was common practice to support the fingers externally by the inside surface of the sleeve nut by using a slow taper which when the sleeve nut is tightened onto the coupling element the slow taper would press the contact fingers inwardly against the tube at the same time that a fast taper was employed to press the flared end of the tube against the abutting end surface of the coupling element. In my invention, I avoid the employment of a slow taper to provide external pressure for the clamping fingers.

In my invention, I avoid the defects hereinbefore mentioned of the prior art sleeve, by heat treating and tempering the steel or other metal of the sleeve whereby the sleeve becomes harder and has a higher tensile strength than the metal of the tube, the coupling element, or the sleeve nut. I preferably make my clamping sleeve of steel which when hardened or tempered has a high tensile strength, whereby the clamping fingers produce ample contact pressure to the tube without the employment of a slow taper between the fingers and the sleeve nut. The hardened sleeve also permits the internal clamping shoulder 30 of the sleeve nut from crushing the intermediate tapered portion 29 so that when the sleeve nut 21 is disengaged from the coupling element the clamping fingers spring back to their original position. Another desirable feature arising from the fact that my sleeve is made of metallurgically hardened metal or steel is that the internal conical surface 36 in the annular end portion 28 of the clamped sleeve does not swell or "ride-up" upon the flare as the sleeve nut is tightened on the coupling element. Tests further indicate with my hardened clamping sleeve that an improved sealing engagement is effected between the flared end of the tube and the abutting end of the coupling element. This improved sealing engagement appears to arise out of the fact that the clamping sleeve is hard, and as a result it does not tear the flare but on the other hand, provides a hard backing surface which prevents the flare from "giving" with respect to the abutment end 24 of the coupling element. Furthermore, it appears that the friction between my hard sleeve and the part which it engages is reduced, which minimizes the tendency to twist the tube as the sleeve nut is turned onto the fitting element. The clamping fingers do not engage the tube with a good tight frictional grip until the sleeve nut is substantially turned completely "home." This delayed action of the fingers gripping the tube also minimized the tendency of twisting the tube.

My clamping sleeve may be metallurgically hardened and tempered by any suitable well-known heat treating method. The clamping sleeve when treated has an increased hardness and tensile strength. It is not brittle and will not crack when the sleeve nut is threaded onto the coupling element. I preferably employ steel or an equivalent metal in making my sleeve. The heat treated steel fingers are strong and when they are contracted about the tube, they grip the tube with a good strong frictional engagement, even to the extent of necking or reducing the diameter of the tube a few thousandths of an inch. My heat treated clamping sleeve will not swage or "run-up" the flare of the tube when the sleeve nut is turned on tightly to the coupling element, and has a property of resiliency so that the clamping fingers and the tapered intermediate portion spring back to their original position when the sleeve nut is unscrewed from the coupling element 19.

Inasmuch as my clamping sleeve does not require the use of a slow taper to press the fingers inwardly, my sleeve does not have to be made with close manufacturing tolerances. The frictional grip afforded by the fingers is sufficient to relieve the flare of a portion of the longitudinal pull on the tube, thereby reducing the possibility of damage to the flare when extremely high pressures are used within the tube. The clamping sleeve may be made of stainless steel where a problem of corrosion is present, although plain steel may be used and thereafter give a protective coating against corrosion.

Although I have described my invention with a certain degree of particularity in its preferred form, it is understood that the present disclosure of the preferred form has been made only by way of example and that numerous changes in the details of construction and the combination and arrangement of parts may be resorted to without departing from the spirit and the scope of the invention as hereinafter claimed.

What is claimed is:

In a coupling device for a tube having a flared end portion, first and second coupling members adapted to be connected together, said first coupling member having a tapered seat against which the flared end portion of the tube is adapted to be clamped, said second coupling member having an annular inner surface terminating in an internal clamping shoulder, a clamping sleeve surrounding the tube and mounted in the second coupling member, said sleeve comprising at one end thereof an annular body portion adapted to engage the flared end portion of the tube and at the other end thereof a plurality of rearwardly extending fingers contractible about said tube, said sleeve having intermediate its ends a cam shoulder adapted to be engaged by the internal clamping shoulder of the second coupling member, said sleeve being composed of heat treated and tempered steel of sufficient tensile strength and uniform hardness throughout its mass to render is practically non-distortable and fitting within said second coupling member with sufficient clearance to permit the ready disengagement of the sleeve and the said coupling member after the coupling members and the sleeve have been once firmly assembled, said fingers having sufficient resiliency to spring back and free the tube when the second coupling member is disengaged from the first coupling member.

GEORGE V. WOODLING.

REFERENCES CITED

The following references are of record in the file of this patent:

UNITED STATES PATENTS

| Number | Name | Date |
|---|---|---|
| 2,271,502 | Snyder | Jan. 27, 1942 |
| 2,404,142 | Parker | July 16, 1946 |
| 2,191,582 | Parker | Feb. 27, 1940 |
| 2,269,629 | Kreidel | Jan. 13, 1942 |
| 2,171,217 | Kreidel | Aug. 29, 1939 |
| 2,354,460 | Hillis | July 25, 1944 |
| 1,893,442 | Parker | Jan. 7, 1933 |